United States Patent [19]

Noji et al.

[11] Patent Number: 4,514,757

[45] Date of Patent: Apr. 30, 1985

[54] CATV SELECTION DEVICE

[75] Inventors: Tasuku Noji; Katsumi Tobita, both of Soma, Japan

[73] Assignee: Alps Electric Co., Ltd., Japan

[21] Appl. No.: 279,689

[22] Filed: Jul. 2, 1981

[30] Foreign Application Priority Data

Jul. 3, 1980 [JP] Japan .................. 55-91033

[51] Int. Cl.³ .................. H04N 7/16; H04N 5/782
[52] U.S. Cl. .................. 358/86; 358/191.1; 358/181; 455/3
[58] Field of Search .................. 358/86, 193.1, 181, 358/191.1; 455/2, 3, 6, 131, 190

[56] References Cited

U.S. PATENT DOCUMENTS

| | | | |
|---|---|---|---|
| 3,730,980 | 5/1973 | Kirk, Jr. .................. | 455/190 |
| 3,882,266 | 5/1975 | Walding .................. | 455/190 |
| 3,882,392 | 5/1975 | Harney .................. | 455/6 |
| 4,002,986 | 1/1977 | Ma .................. | 455/188 |
| 4,009,441 | 2/1977 | Kumagai et al. .................. | 455/190 |
| 4,270,212 | 5/1981 | Furukawa .................. | 358/86 |
| 4,272,791 | 6/1981 | Rifken .................. | 358/86 |
| 4,276,562 | 6/1981 | Stewart et al. .................. | 358/181 |
| 4,363,033 | 12/1982 | Lovely .................. | 358/181 |

Primary Examiner—John C. Martin
Assistant Examiner—Edward L. Coles
Attorney, Agent, or Firm—Guy W. Shoup

[57] ABSTRACT

A CATV selection device adapted to convert the desired CATV signal into a vacant channel frequency of the TV set and to deliver the vacant channel frequency as an output to make it possible to watch the desired CATV broadcasting. The device has an input terminal adapted to receive both of the TV broadcasting signal and the CATV broadcasting signal, an output terminal for delivering the broadcasting signal to the input terminal of a TV set, a conversion circuit adapted to receive the CATV broadcasting signal corresponding to the selected channel into the vacant channel frequency of the TV set, and electronic switch circuit adapted to effect a switching between a first mode in which the broadcasting signal from said input terminal is bypassed to the output terminal and a second mode in which the same broadcasting signal is delivered to the conversion circuit, and a selection section having push buttons for selecting the desired CATV broadcasting channel and a bypass button for bypassing the broadcasting signal from the input terminal to the output terminal.

4 Claims, 12 Drawing Figures

2

CATV SELECTION DEVICE

BACKGROUND OF THE INVENTION

The present invention relates to a CATV (Community Antenna Television) selection device, and more particularly, to a CATV selection device adapted to bypass the ordinary TV broadcasting signal and the CATV signal when selection of a channel from the TV signal is desired, and for converting the CATV signal into the frequency of a vacant channel of the TV set when selection of a channel from the CATV signal is desired.

TV sets capable of receiving both the ordinary TV broadcast signals and CATV signals are available in the U.S.A. and other countries. These TV sets typically have a conversion circuit for converting the CATV signal into a frequency of a vacant channel of the TV set, as well as a special selection mechanism for selecting between reception of a channel from the ordinary broadcast TV signal or the CATV signal. In conventional devices, however, a complicated conversion circuit and selection mechanism are often required, resulting in increased costs and complicated switching operations to select between a channel in the TV broadcasting signal or the CATV signal.

SUMMARY OF THE INVENTION

Accordingly, an object of the invention is to provide a less expensive CATV selection device having a simple construction and capable of permitting a simple switching operation between the mode for receiving the TV broadcast signal and the mode for receiving the CATV signal.

To this end, according to the invention, there is provided a CATV selection device adapted to convert the desired CATV signal into the frequency of a vacant channel of the TV set and to deliver the vacant channel frequency as its output. The device includes an input terminal adapted to receive the ordinary TV signal and a CATV signal simultaneously, and an output terminal adapted to deliver these signals to the input terminal of the antenna of the TV set. A conversion circuit adapted to receive the CATV signal and to convert the CATV signal corresponding to the selected channel into a vacant channel frequency of the TV set is provided and an electronic switching circuit adapted to switch between bypassing the signals received at the input terminal directly to the output terminal, and delivery of the received signals to the conversion circuit is also provided. The switching circuit is actuated by push buttons for selecting the desired CATV channel when receiving a channel in the CATV signal, whereas, for receiving ordinary TV broadcasting, a bypass push button is operated to make the electronic switch circuit pass the signals received from the input terminals directly to the output terminal.

The above and other objects, as well as advantageous features of the invention will become clear from the following description of the preferred embodiments taken in conjunction with the accompanying drawings.

BRIEF DESCRIPTION OF THE DRAWINGS

FIGS. 4 to 8 are illustrations of a mechanism of the CATV selection device in accordance with the invention; wherein FIG. 4 is an outside view of the CATV selection device;

FIG. 5 is an exploded perspective view;

FIG. 6 is a sectional view;

FIGS. 7($a$), 7($b$) and 7($c$) show the upper surface, side surface and reverse surface of a printed circuit board carrying the bypass and switching circuits;

FIG. 8 is a sectional view of an important part of the printed circuit board.

DESCRIPTION OF THE PREFERRED EMBODIMENTS

Figure 1:
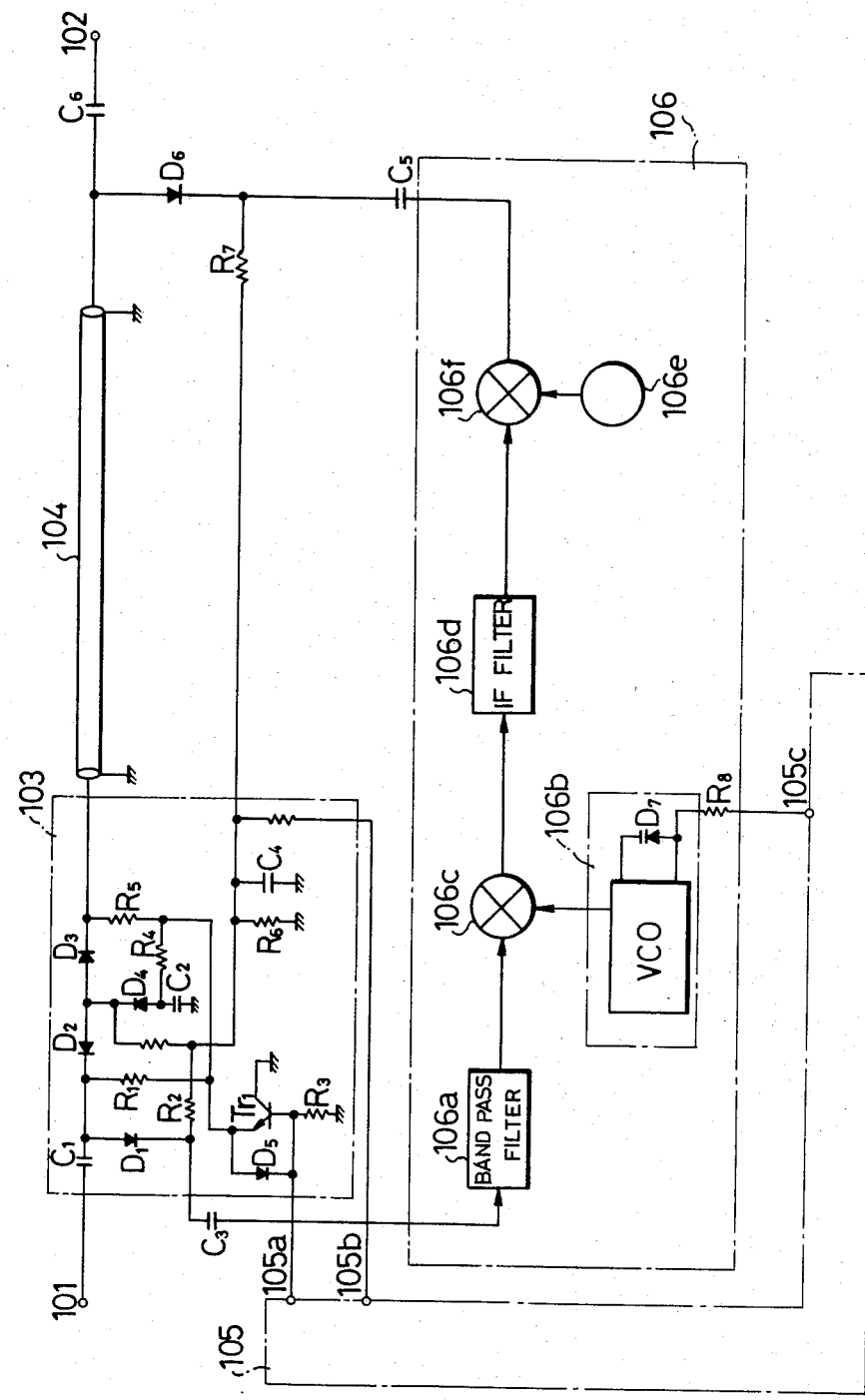
FIG. 1 is a circuit diagram of a CATV selection device in accordance with the invention, with portions of the circuit shown generally.
Figure 2:
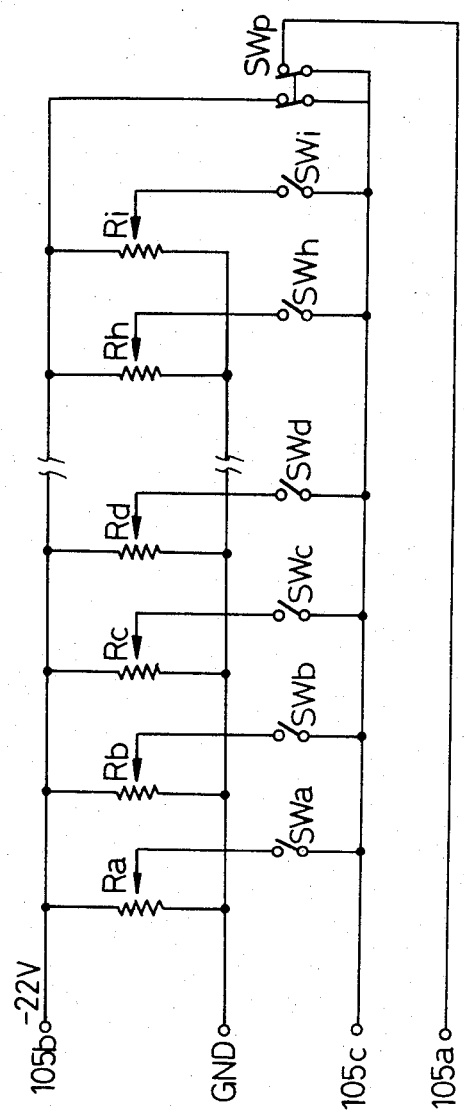
FIGS. 2 and 3 are detailed circuit diagrams.
Figure 3:
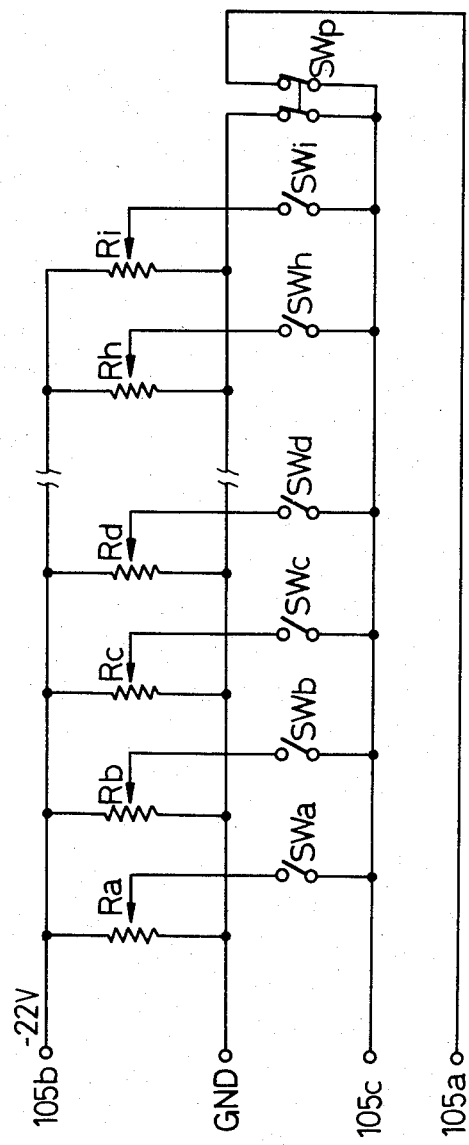

FIGS. 1, 2 and 3 illustrate circuits of a CATV selection device in accordance with the invention. More specifically, FIG. 1 shows the circuit of the device as a whole with the switching and selection circuit shown only generally, while FIGS. 2 and 3 are circuit diagrams of two forms of selection circuits.

In the drawings, a reference numeral 101 denotes an input terminal adapted to receive ordinary TV broadcasting signals and CATV signals, 102 denotes an output terminal adapted to deliver the TV broadcasting signal or the CATV signal, converted by a later-mentioned conversion circuit into the frequency of a vacant channel of the TV set, to the antenna terminal ATN of a TV set which is not shown. An electronic switching circuit 103 is provided for switching between a first mode in which the signal received by the input terminal 101 is delivered directly to the output terminal 102 and a second mode in which the input signal is delivered to a conversion circuit 106 and thereafter to the output terminal 102.

The electronic switching circuit 103 has diodes $D_1$ to $D_5$ switching bias resistances $R_1$ to $R_6$, capacitors $C_1$ to $C_4$ and a transistor $Tr_1$. A reference numeral 104 designates a transmission cable, while 105 denotes a switching and selection circuit. The switching and selection circuit 105 has a bypass terminal 105$a$ adapted to produce a bypass signal, a B terminal 105$b$ adapted to deliver $-22$ v and a tuning terminal 105$c$ adapted to produce the tuning voltage appropriate for the channel corresponding to the CATV channel selected. The switching and selection circuit 105 is connected to the conversion circuit 106 and the electronic switching circuit 103 through the above-mentioned terminals. FIG. 2 shows a preferred form of the switching and selection circuit 105, in which the bypassing operation is made when $-22$ V is applied to the bypass terminal 105$a$. FIG. 3 illustrates a form of the circuit when a grounding potential of zero volts is applied to the bypass terminal 105$a$.

In FIGS. 2 and 3, symbols Ra, Rb, . . . , Ri denote potentiometers, SWa, SWb, . . . , SWi denote selection switches and SWp denotes a bypassing switch. The parts Ra, SWa correspond to the mid band A channel of the CATV broadcasting signal, while Rb and SWb correspond to the B channel. Similarly, parts Ri and SWi correspond to the I channel, that is Rn and SWn correspond to CATV channel N. The potentiometers Ra to Ri are previously adjusted to provide divided potentials equal to the tuning voltage of the channels A to I, respectively. A double-lock structure is provided for the selection switches SWa, SWb, . . . , SWi and the bypass switch SWp, so that all of the switches SWa to SWi are opened as the bypass switch SWp is closed to apply −22 V to the terminal 105a and terminal 105c as shown in FIG. 2. In consequence of closing the switch SWp, the electronic switching circuit 103 of FIG. 1 acts to bypass the input signal received by the input terminal 101 directly to the output terminal 102 through the transmission cable 104. Also, the conversion circuit 106 is isolated from the frequencies of the TV broadcasting signal and the CATV signal. On the other hand, if any one of the selection switches SWa to SWi is operated, the bypass switch SWp is actuated to open the circuit to the bypass terminal 105a. At the same time, the tuning terminal 105c receives a tuning voltage corresponding to the potentiometer of the selection switch actuated. In consequence, the electronic switching circuit 103 stops bypassing the received signals directly to the output terminal 102, and delivers the input signal to the conversion circuit 106 so that the latter converts the CATV signal of the channel of the selection switch actuated to the vacant channel frequency of the TV set, and delivers the same to the output terminal 102.

A reference numeral 106 denotes the conversion circuit adapted to receive the CATV signal and to output the same after conversion into a vacant channel frequency of the TV set as the selection switches SWa to SWi are operated. The conversion circuit includes a bandpass filter 106a for the mid band CATV signal, and a variable capacitance oscillator 106b having an oscillator portion VCO and a varactor diode $D_7$. The oscillator 106b is adapted to oscillate at the frequency corresponding to the selected channel, and a first mixer 106c is adapted to mix the output from the CATV signal bandpass filter 106a and the output from the variable capacitance oscillator 106b. An IF filter 106d, a local oscillator 106e adapted to oscillate at a predetermined frequency, and a second mixer 106f adapted to mix the outputs from the IF filter 106d and the oscillator 106e are also provides in a manner well understood in the art.

The CATV selection device of this embodiment having the described construction operates in a manner explained hereinunder.

Assume here that one, for example SWa, of the selection switches SWa to SWi of FIG. 2 is manipulated. As a result, the bypass switch SWp is opened and the tuning voltage corresponding to the channel A is applied to the tuning terminal 105c.

As the bypass switch SWp is opened, the transistor $TR_1$ of the electronic switching circuit 103 becomes conductive due to the bias applied by resistor $R_3$, and diodes $D_1$, $D_4$, $D_6$ are biased forwardly, whereas the diodes $D_2$ and $D_3$ are reversely biased as a result of the −22 V appearing at terminal 105b. In consequence, the input signal applied to the input terminal 101 is delivered to the conversion circuit 106 through the capacitor $C_1$, diode $D_1$ and the capacitor $C_3$. The conversion circuit 106 receives a tuning voltage for the A channel from the tuning terminal 105c, so that the conversion circuit 106 converts the CATV signal of the A channel to the vacant channel frequency of the TV set, and delivers the converted signal to the ANT terminal of the TV set (not shown) through the capacitor $C_5$, diode $D_6$ and the capacitor $C_6$ and via the output terminal 102. It is therefore possible to watch the CATV broadcasting of A channel by selecting the vacant channel of the TV set.

Thereafter, as the bypass switch SWp is closed, the selection switch SWa is opened, and the voltage −22 V is applied to the bypass terminal 105a and the tuning terminal 105c. As the bypass terminal 105a receives −22 V, the transistor $Tr_1$ is turned off, while the diode $D_5$ is forwardly biased. The forward voltage from the diode $D_5$ serves to reversely bias diodes $D_1$, $D_4$ and $D_6$ through resistances $R_1$, $R_4$ and $R_5$ respectively; while diodes $D_2$ and $D_3$ are biased forwardly through respective resistances $R_1$ and $R_5$. As a result, the input signal applied to the input terminal 101 is delivered to the output terminal 102 through the capacitor $C_1$, diode $D_2$, diode $D_3$, transmission cable 104 and the capacitor $C_6$. It is therefore possible to watch ordinary TV broadcasting by selecting the desired channel of the TV set. In this state, the tuning terminal 105c receives −22 V. Therefore, the voltage −22 V is imposed also on the varactor $D_7$, and the oscillation frequency of the variable capacitor oscillator 106b is fixed at a level different from that of the receiving band of the CATV signal, so that the received TV signal is never interfered by the output signal of the conversion circuit 106.

Figure 4:
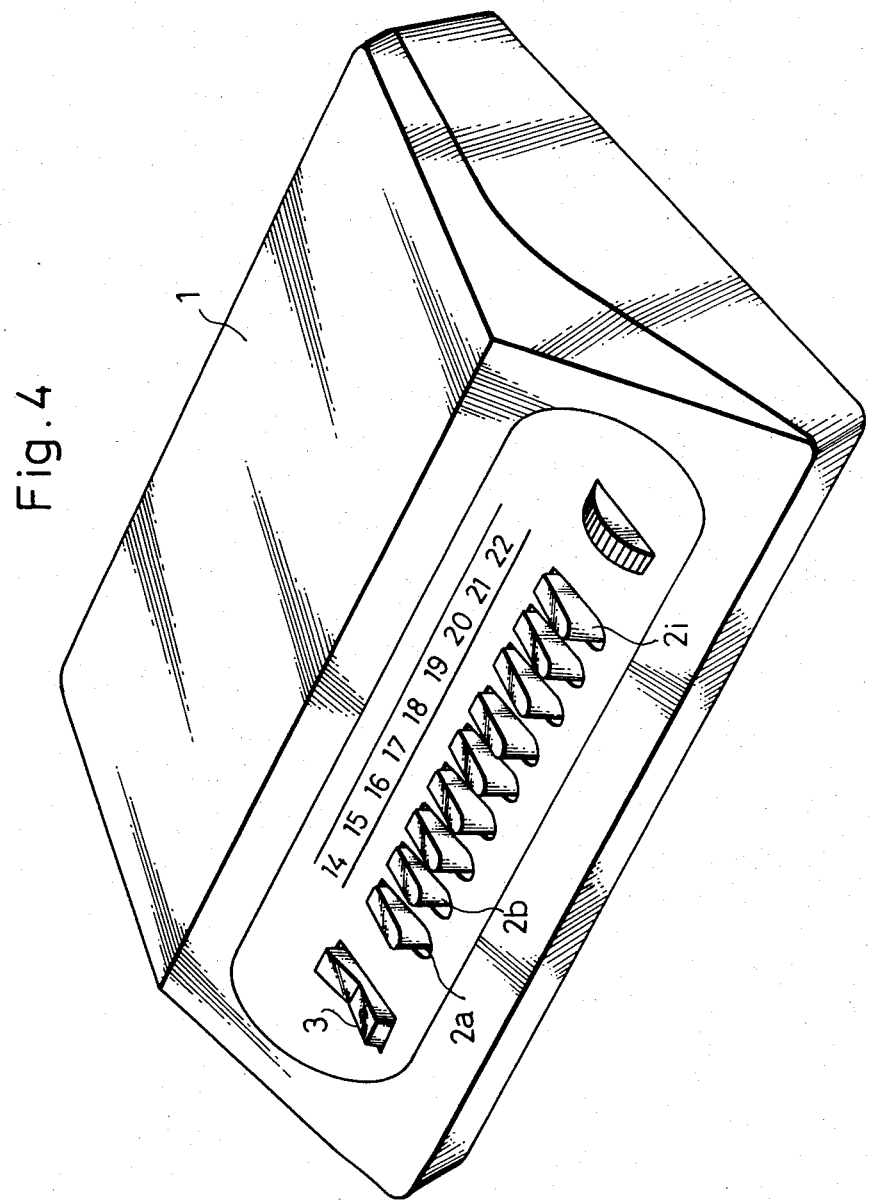
Figure 5:
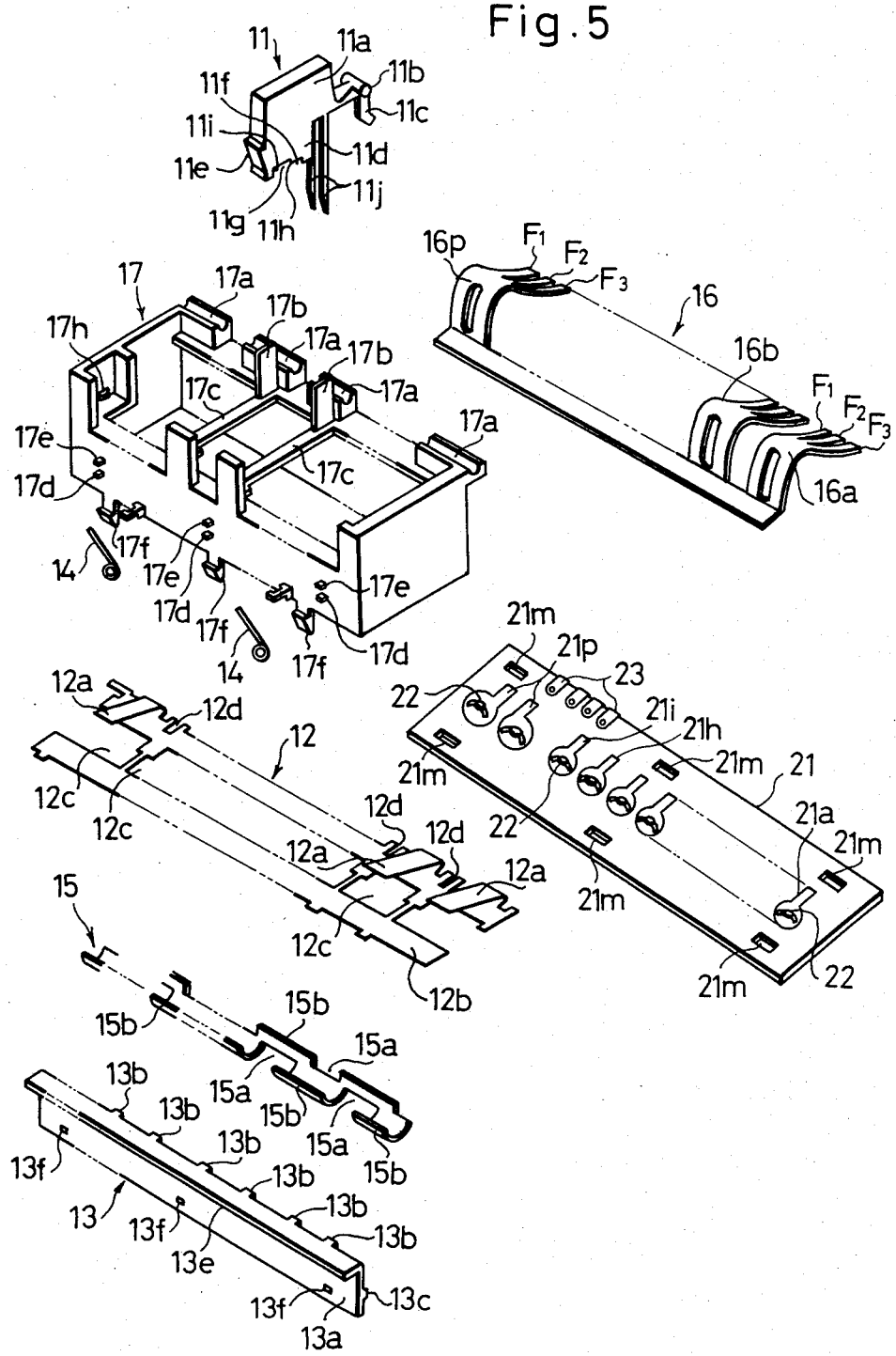
Figure 6:
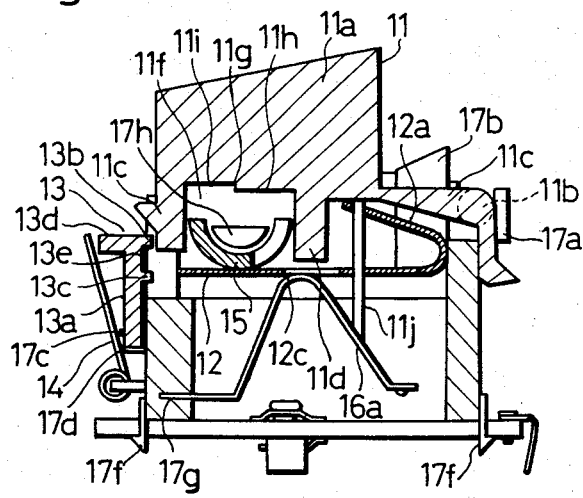
Figure 7A:
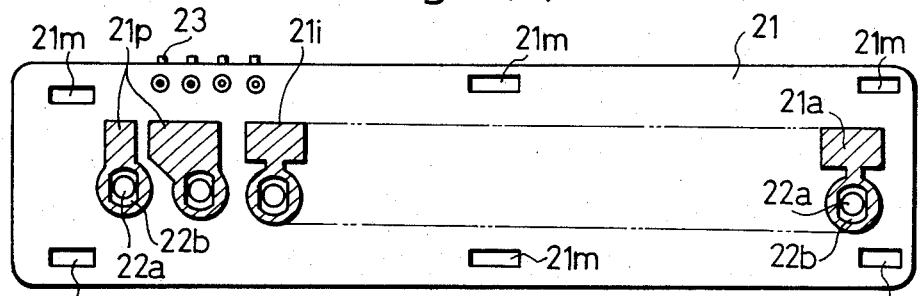
Figure 7B:
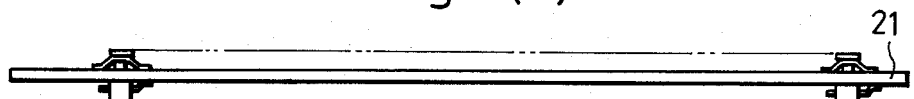
Figure 7C:
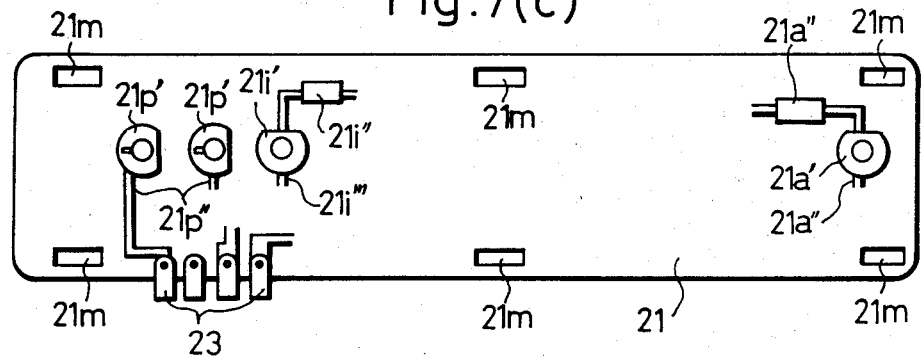
Figure 8:
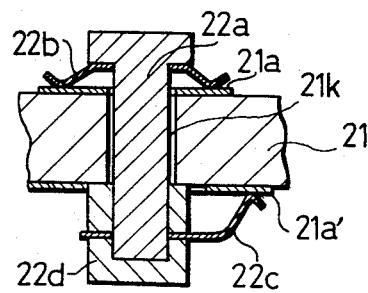

FIGS. 4 to 8 show the mechanism of the CATV selection device in accordance with the invention. More specifically, FIG. 4 shows the outer appearance, FIG. 5 is an exploded perspective view, FIG. 6 is a sectional view, FIGS. 7(a), 7(b) and 7(c) are a top plan view, side elevational view and rear side view of a printed circuit board, and FIG. 8 is a sectional view of an essential part of the circuit board.

Referring to FIG. 4, a reference numeral 1 denotes a frame of the CATV selection device, and 2a, 2b, ..., 2i denote selection buttons for the CATV. By operating the selection buttons, it is possible to select and receive the channels A, B, ... and I of the CATV signal. These selection push buttons 2a to 2i are mounted to correspond to the selection switches SWa, SWb, ..., SWi shown in FIG. 2 or 3, so that they actuate the corresponding switches when depressed. A reference numeral 3 denotes a bypass button which is mounted to correspond to the bypass switch SWp shown in FIG. 2 or 3. As the bypass button is depressed, the bypass switch SWp is turned on to make it possible to watch ordinary TV broadcasting from the TV set.

Referring to FIGS. 5 and 6, a reference numeral 11 denotes a push button made of plastic and corresponds to each of the selection buttons 2a to 2i shown in FIG. 4. The push button 11 is comprised of a main body portion 11a, and L-shaped member 11c having a shaft 11b acting as a fulcrum for pivotal movement of the main body portion 11a, a contact pressing projection 11d provided at the bottom of the main body portion 11a and adapted to press a contact as will be described below, a cam engaging projection 11e adapted to press and rotate a cam plate described below and to engage an engaging tab on the cam plate when the switch is depressed, and a recess 11f formed by the contact pressing projection 11d, the bottom of the main body portion 11a and the cam engaging projection 11e. A projected surface 11h and a recessed surface 11i are formed with a step therebetween on the top wall defining recess 11f. Also, two vibration preventing projections 11j are formed on the bottom of the operation block 11a.

A reference numeral 12 designates a metallic leaf spring formed in a generally V-shape and having identical portions for each of the respective push buttons 11 as shown in FIG. 5. These portions include a spring portion 12a extending upwardly from a base portion 12b, an aperture 12c formed in the base portion 12b and penetrated by the contact pressing projection 11d of the respective push button 11, and a notched portion 12d for mounting the leaf spring on the frame. Each spring portion 12a abuts the rear side of the L-shaped member 11c of the respective push button 11 as can be seen in FIG. 6, and is adapted to bias the corresponding push button 11 upwardly in the direction reverse to the direction of depression.

A reference numeral 13 denotes a cam plate having an L-shaped cross-section, provided commonly for all push buttons. The cam plate 13 is provided at one side of the base portion 13a thereof with a plurality of engaging tabs 13b corresponding to the respective push buttons 11 and a continuous projection 13c common to all push buttons 11. Each engaging tab 13b forms with the continuous projection 13c in recess 13e for each respective push button 11 (see FIG. 6). At the same time, a continuous projection 13d is formed at the top of the other side of the base portion 13a in such a manner as to make an L shape in combination with the base portion 13a. Also, a bore 13f for mounting the cam plate to the frame is formed at both end portions and the center of the base portion 13a. In operation, as the push button 11 is depressed, the engaging tab 13b is pressed by the cam engaging projections 11e of the push button, so that the cam plate 13 starts to rotate in the counterclockwise direction as viewed in FIG. 6. Then, as the push button 11 is further depressed, the cam engaging projection 11e drops into the recess 13e to engage the engaging tab 13b, so that the push button 11 is locked in the depressed position; while any previously depressed push button is released. A reference numeral 14 designates coiled spring attached to to a later-mentioned frame and adapted to abut the tab 13d of the cam plate 13 so as to bias the cam plate in the reverse direction to the direction of rotation by manual depression, to thereby maintain the engagement between the cam engaging projection 11e and the engaging tab 13b, i.e. to maintain the push button 11 in the depressed state.

A reference numeral 15 denotes a cam for preventing simultaneous operation of two adjacent push buttons. This cam 15 is mounted for free rotation by a depression of a push button and is disposed beneath the recess 11f of each push button 11 and on the base portion 12b of the leaf spring 12. The cam 15 has a substantially semicircular cross-sectional shape and is provided in a staggered manner, as shown in FIG. 5, with notches 15a at positions corresponding to respective push buttons. The arrangement is such that depression of adjacent push buttons provides opposite direction of rotation for the sumultaneous lock prevention cam 15. A reference numeral 15b designates projections formed between adjacent notches. The cam 15 has both ends engaged by semicircular projections 17h of the frame, as will be mentioned below, and is adapted to be rotated while being guided by these semicircular projections.

A reference numeral 16 designates a contact having resiliency and provided with mountain-shaped contacts 16a, 16b, . . . , 16i, 16p corresponding to respective push buttons 11. Three fingers $F_1$, $F_2$, $F_3$ are formed at the ends of respective contacts. As a push button 11 is depressed, the contact pressing projection 11d extending through the bore 12c of the leaf spring 12 presses the corresponding one of the contact 16a to 16i, 16p thereby to effect the switching operation. A reference numeral 17 designates a frame having, for each switch, a shaft support portion 17a adapted for rotatably supporting the shaft portion 11b of the respective push buttons, a tabular projection 17b adapted for engagement with the notch 12d of the leaf spring 12, a leaf spring mounting portion 17c, a projection 17d formed on the front wall of the frame, a projection 17e located above the projection 17d for fitting within the respective bores 13f formed in the cam plate 13, and a base plate attaching projection 17f for attaching a printed circuit board to the frame, as will be set forth more fully below. The frame 17 thus has a cam plate attaching portion for rotatably supporting the cam plate 13 by the projection 17d and 17e, a contact attaching portions 17g (see FIG. 6), and semicircular projection 17h for fitting within the ends of the cam 15 and adapted for guiding the rotation of the cam 15.

A reference numeral 21 designates a printed circuit board on which is formed the switching and selection circuit 105 shown in FIG. 3. As shown in detail in FIG. 7(a), a conductor patterns 21a, 21b, . . . , 21p are formed on the surface of the printed circuit board, so as to correspond to the contact points 16a, 16b, . . . , 16i 16p of the contact 16. The contact points 16a, 16b, . . . , 16i and the conductor patterns 21a, 21b, . . . , 21i in combination constitute respectively, the selection switches SWa, SWb, . . . , SWi shown in FIG. 2 Similarly, the bypass switch SWp is formed by the cooperation between the contact point 16p and the conductor pattern 21p. In these switches, the contact points 16a, . . . , 16i, 16p constitute the tuning terminals shown in FIG. 2, while conductor patterns 21a, . . . , 21i constitute the movable contacts of the selection potentiometers Ra to Ri. At the rear side of the printed circuit board 21, formed in correspondence with the conductive patterns 21a to 21i are ring-shaped resistance patterns 21a'', 21b'', . . . , 21'' resistance elements 21a'' to 21i'' having fixed resistance values and wiring patterns. Also, a plurality of conductor pin insertion holes 21k are formed through the thickness of the printed circuit board in such a manner as to be encircled by the conductor patterns 21a to 21i at the obverse side and by the resistance patterns 21a' to 21i' at the reverse side. These holes are for receiving the conductor pins, as shown in FIG. 8.

At the reverse side of the printed circuit board 21, ring shaped conductor patterns 21p', 21p', and wiring patterns 21p'', 21p'' are formed so as to correspond to the conductor patterns 21p, 21p. Reference numerals 21m illustrate bores formed on the frame 17 and corresponding to the projections 17f for attaching the circuit board to the frame 17. Thus, the print circuit board 21 is mounted on the frame 17 by fitting the plate attaching projections 17f into respective bores 21m. Reference numerals 22 denote adjusters rotatably aligned with respective bores 21k and providing electric communication between the conductor patterns 21a, . . . , 21i, 21p and the corresponding resistance patterns 21a', 21i' and conductor patterns 21p' 21p'. Selection potentiometers Ra, Rb, . . . , Ri shown in FIGS. 2 and 3 are composed of the resistance patterns 21a', 21b', . . . , 21i' and the resistance elements 21a'', 21i''.

Each adjuster 22 has, as shown in FIG. 8, a conductor pin 22a, a metallic washer 22b, a slider 22c made of a metal, and a fixing member 22d made of an insulating material, and is adapted to be inserted in a corresponding bore 21. Washer 22 makes contact with the conductive patterns 21a, 21b, . . . , 21i, 21p. The sliders 22c make contact with circular resistance patterns 21a', 21b', . . . , 21i, and the conductor pattern 21p' formed on the reverse side, and are united with the conductor pins 22a by means of the fixing members 22d. Therefore, as the head portion of the fixing member 22d is rotated, the slider 22c slides on the resistance patterns 22a', 22b', 22i' so that voltage of a predetermined dividing ratio is obtained at the slider 22c. The resistance elements 21a", 21b", ..., 21i" are loaded to provide adequate potential dividing ratios. The minute or fine adjustment of the potential dividing ratio is achieved by the resistance patterns 22a', 22b', ..., 2i'. Reference numeral 23 designates terminals which serve as the B terminal 105b of the circuit shown in FIG. 2 to receive the voltage −22 V, or as the ground terminal. Alternatively, the terminal acts as a tuning terminal 105c which is led to the outside, or as a bypass terminal 105a.

Figure 9A:
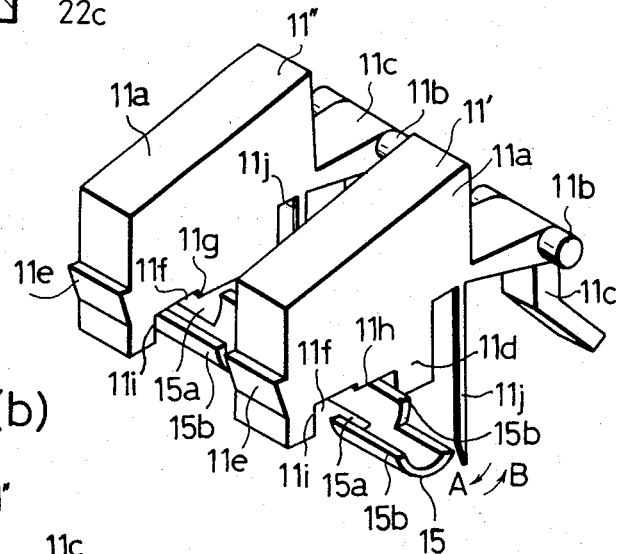
FIGS. 9($a$) and ($b$) show illustrations of mechanism preventing actuation of two adjacent switches.
Figure 9B:
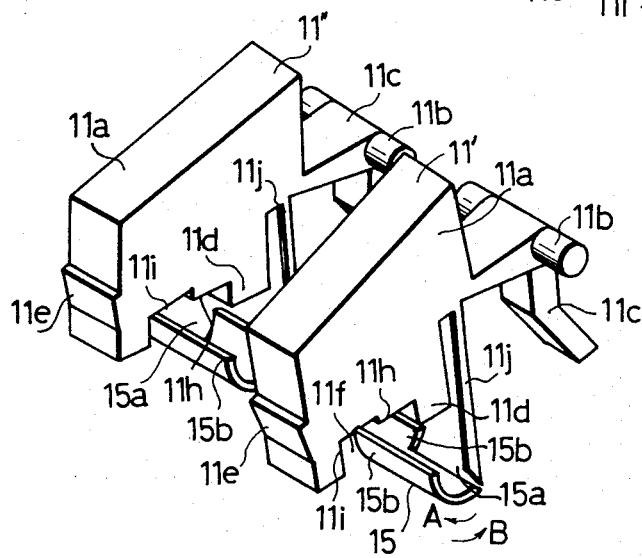

Hereinafter, the operation of the mechanism preventing actuation of two of the push button simultaneously will be described. FIG. 9 illustrates the mechanism, in which two buttons are shown by way of example. In this Figure, the same reference numerals are used to denote the same parts or members as those shown in FIGS. 5 and 6, and detailed description thereof is omitted. Reference numerals 11', 11" denote any two adjacent push button switches corresponding to the selection buttons 2a to 2i and the bypass button 3. If the push button 11' corresponding to the forward notch of the cam 15 is depressed solely (see FIG. 9(a), the projection 15b of the simultaneous lock prevention cam 15 is depressed by the projected surface 11h of the push button 11', so that the simultaneous lock prevention cam 15 starts to rotate in the direction of arrow A. As the push button 11' is depressed further, the cam 15 is further rotated in the clockwise direction, so that the notch 15a fits around the operation block 11a of the push button 11 as shown in FIG. 9(b). On the other hand, the engaging tab 13b of the cam plate 13 (see FIG. 6) is depressed by the cam engaging projection 11e, so that the cam plate 13 starts to rotate in the counter-clockwise direction. As a predetermined stroke is achieved, the cam engaging projection 11e drops in the recess 13d and comes into engagement with the engaging tab 13b. In this state, the cam plate 13 is pressed by the coiled spring 14, so that the cam engaging projection 11e and the engaging tab 13b are held in mutual engagement to lock the push button 11' in the locked state.

To the contrary, if the push button 11" corresponding to the notch 15a formed in the rear of the simultaneous lock prevention cam 15 is depressed solely (See FIG. 9(b)), the projected portion 15b of the simultaneous lock prevention cam 15 is depressed by the recessed surface 11i of the push button 11", so that the simultaneous lock prevention cam 15 starts to rotate in the counter-clockwise direction as shown by the arrow B. As the push button 11" is depressed further, the cam 15 is rotated in the direction of the arrow B, so that the notch 15a fits around the operation block 11a of the push button switch 11".

On the other hand, the cam plate 13 starts to rotate in the counter-clockwise direction in accordance with the stroke of depression of the push button 11", so that the push button 11' is disengaged from the cam plate 13. In consequence, the push button 11' is reset to the non-depressed position by the resilient force of the leaf spring 12. At the same time, the corresponding contact 16 is reset to the non-depressed position. As a predetermined stroke of the push button 11" reaches a predetermined amount, the cam engaging projection 11e of the push button 11" drops into the recess 13d so that the cam plate 13 is pressed by the coiled spring 14 thereby to engage the engaging tab 13b of the cam.

Even if the push button 11" is released from the manual depressing force in this state, the cam engaging projection 11e and the engaging tab 13b are maintained in mutual engagement with each other to lock the push button 11" in the depressed state, because the cam plate 13 is depressed by the coiled spring 14.

If adjacent push buttons 11', 11" are depressed simultaneously, the push button 11' exerts a force on the cam 15 in the direction A, while the push button 11" exerts such a force as to rotate the same in the direction of the arrow B, so that the cam 15 is prevented from being rotated. In consequence, neither the push buttons 11' nor the push button 11" reach the stroke necessary for actuating the contact 16. Also, the cam engaging projections 11e of the push buttons 11', 11" do not reach the stroke for engaging the engaging tab 13b of the cam plate 13, so that the undesirable simultaneous lock of adjacent push buttons 11', 11" is avoided.

The switching operation upon depression of the push button 11 is achieved in a manner explained hereinbelow. As the push button 11 corresponding to the A channel is depressed, the contact pressing projection 11d presses the contact point 16a so that the push button 11 is locked in the depressed states as stated before. In this locked state, the contact point 16a makes a contact with the conductor pattern 21a formed on the printed circuit board 21 to turn the switch on. The, if another push button is depressed, the locked push button is released to turn the switch off.

Hereinafter, an explanation will be made as to the selection operation by the selection buttons 2a to 2i and the bypass operation performed by the operation of the bypass button 3.

As the bypass button 3 having the construction shown in FIG. 6 is depressed as illustrated in FIG. 4, the contact point 16f corresponding to this bypass button 3 is lowered, so that the finger portions F₁, F₂ and F₃ (FIG. 5) formed at the ends of the contact point make contact with the conductor patterns 21p, 21p formed on the surface of the printed circuit board 21 shown in FIG. 7. This contact is maintained by the action of the lock mechanism. In consequence, the voltage −22 V is imposed on the tuning terminal 105c and the bypass terminal 105a (see FIG. 2). As the voltage −22 V appears at the tuning terminal 105c, a voltage −22 V is applied to the varactor D₇ of the variable capacitance oscillator 106b (FIG. 1), so that the oscillation frequency of the variable capacitance oscillator 106b is fixed at a level apart from the CATV receiving band. Also, as the voltage −22 V is applied to the bypass terminal 105a, the input signal applied to the input terminal (FIG. 1) is made to bypass through the transmission cable to the output terminal 102 and further to the ATN terminal of the TV set. Then, as any one of the selection push button 2a to 2i is depressed for receiving the CATV signal, the bypass button 3 is unlocked so that the bypass switch SWp shown in FIG. 1 is turned off. Simultaneously, the depressed selection button is locked in the depressed state, so that one of the contact points 16a to 16i corresponding to the depressed button is held in contact with the associated one of the conductor patterns 21a to 21i. In consequence, the electronic circuit 103 is turned off and the predetermined tuning voltage of the predetermined channel is applied to the tuning terminal 105c to permit the receipt of the CATV broadcasting.

As has been described, according to the invention, a mechanism for preventing actuation of two switches is used to act in relation to the bypass button and the selection buttons of CATV, so that the switching from the mode for receiving the CATV to the mode for receiving the ordinary TV broadcasting and vice versa can be made simply by depressing the bypass button or the selection button.

According to the invention, the oscillation frequency of the variable volume oscillator during receiving of the TV broadcasting is fixed at a level apart from the receiving band of the CATV signal, so that the signal produced by the conversion circuit does never interfere with the receiving of the broadcast TV signal.

The CATV selection device of the invention can simplify the construction of the circuit and the selection mechanism and to lower the cost of the same as compared with the conventional apparatus in which the TV broadcasting signal and the CATV signal are processed as a unit.

Although the invention has been described through specific terms, it is to be understood here that various changes and modifications may be imparted to the described embodiment without departing from the scope of the invention which is limited solely by the appended claims.

What is claimed is:

1. A device for delivering either broadcast TV signals or a CATV signal to a TV set having a vacant frequency not used for local TV broadcast signals, said device having means including an input terminal for simultaneously receiving a broadcast TV signal carrying a plurality of TV channel signals and a CATV signal carrying a plurality of CATV channel signals, means for selecting a specific CATV channel signal from said CATV signal, an output terminal adapted to be connected to the TV set, conversion means for receiving said CATV signal to convert the selected CATV channel signal into the frequency of the vacant channel of the TV set, switch means for switching electronically between bypassing signals received by said input terminal to said output terminal and delivery of signals received by said input terminal to said conversion means, said selecting means including selection push buttons for selecting desired CATV broadcasting channels and a bypass button for bypassing the signals received by said input terminal to said output terminal, wherein, for receiving a channel in the CATV signal said selection buttons are selectively operated to make said electronic switching means deliver the signal from said conversion means to said output terminal, whereas, for receiving TV broadcast signals, said bypass push button is operated to make said electronic switch means deliver said signal from said input terminal to said output terminal, said switch means including a first blocking diode connected between said input terminal and said output terminal, a second blocking diode connected between said input terminal and said conversion means, and biasing means for forwardly biasing said first blocking diode while reversely biasing said second blocking diode when broadcast TV signals are selected and reversely biasing said first blocking diode while forwardly biasing said second blocking diode when said CATV signal is selected, further including means including a third blocking diode connected between said conversion means and said output terminal, said biasing means forwardly biasing said third blocking diode when said CATV signal is selected and reversely biasing said third blocking diode when said broadcast TV signals are selected.

2. A device as claimed in claim 1, means for setting the output of said conversion means to a frequency different than that of the received signals during selection of said broadcast TV signals.

3. A selection device as claimed in claim 1, said conversion means being isolated from frequencies other than frequencies of said TV broadcasting signal and said CATV signal.

4. A selection device as claimed in claim 3, said selection means comprising a means for preventing said selection push buttons and said bypass button from being locked simultaneously.

* * * * *